US012532092B2

(12) United States Patent
Han et al.

(10) Patent No.: US 12,532,092 B2
(45) Date of Patent: Jan. 20, 2026

(54) PIXEL ARRAY FOR OPTIMIZING DUAL CONVERSION GAIN OPERATION OF PIXELS SHARING FLOATING DIFFUSION REGION AND IMAGE SENSOR INCLUDING THE SAME

(71) Applicant: SAMSUNG ELECTRONICS CO., LTD., Suwon-si (KR)

(72) Inventors: Jinhwa Han, Suwon-si (KR); Heesang Kwon, Suwon-si (KR); Wonchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 131 days.

(21) Appl. No.: 18/540,209

(22) Filed: Dec. 14, 2023

(65) Prior Publication Data

US 2024/0334088 A1    Oct. 3, 2024

(30) Foreign Application Priority Data

Mar. 27, 2023 (KR) .......................... 10-2023-0039925

(51) Int. Cl.
| | |
|---|---|
| *H04N 25/77* | (2023.01) |
| *H04N 25/46* | (2023.01) |
| *H04N 25/59* | (2023.01) |
| *H04N 25/772* | (2023.01) |
| *H04N 25/778* | (2023.01) |
| *H04N 25/78* | (2023.01) |

(52) U.S. Cl.
CPC ............ *H04N 25/77* (2023.01); *H04N 25/46* (2023.01); *H04N 25/59* (2023.01); *H04N 25/772* (2023.01); *H04N 25/778* (2023.01); *H04N 25/78* (2023.01)

(58) Field of Classification Search
CPC ........ H04N 25/46; H04N 25/59; H04N 25/77; H04N 25/772; H04N 25/778; H04N 25/78
See application file for complete search history.

(56) References Cited

U.S. PATENT DOCUMENTS

| | | |
|---|---|---|
| 8,344,306 B2 | 1/2013 | Kim |
| 10,334,189 B1* | 6/2019 | Xu ........................ H04N 25/778 |
| 11,343,449 B2* | 5/2022 | Paik ....................... H04N 25/78 |
| 11,348,955 B2 | 5/2022 | Chen et al. |
| 11,438,531 B2* | 9/2022 | Takahashi .............. H04N 25/78 |
| 11,451,730 B2 | 9/2022 | Malinge et al. |
| 2021/0273006 A1 | 9/2021 | Tagashi et al. |

(Continued)

*Primary Examiner* — Lin Ye
*Assistant Examiner* — Chriss S Yoder, III
(74) *Attorney, Agent, or Firm* — Sughrue Mion, PLLC

(57) ABSTRACT

A pixel array includes: unit pixel groups; and two column lines provided for each column. Each of the unit pixel groups includes rows, a first pixel group comprising a plurality of pixels, a second pixel group comprising a plurality of pixels. The first pixel group and the second pixel group are arranged in a row direction. A pixel signal is output by simultaneously reading out: unit pixel groups that are connected to a first column line and that do not share a first floating diffusion region, and unit pixel groups that are connected to a second column line different from the first column line and that do not share a second floating diffusion region. At least one of the first floating diffusion region and the second floating diffusion region is between a dual conversion transistor and a reset transistor.

20 Claims, 10 Drawing Sheets

(56) References Cited

U.S. PATENT DOCUMENTS

2022/0139981 A1    5/2022   Tang et al.
2022/0246653 A1    8/2022   Tonegawa
2022/0302198 A1    9/2022   Kang et al.

\* cited by examiner

PIXEL ARRAY FOR OPTIMIZING DUAL CONVERSION GAIN OPERATION OF PIXELS SHARING FLOATING DIFFUSION REGION AND IMAGE SENSOR INCLUDING THE SAME

CROSS-REFERENCE TO RELATED APPLICATIONS

This application is based on and claims priority under 35 U.S.C. § 119 to Korean Patent Application No. 10-2023-0039925 filed on Mar. 27, 2023, in the Korean Intellectual Property Office, the disclosure of which is incorporated by reference herein in its entirety.

BACKGROUND

The present disclosure relates to an electronic device, and more particularly, relates to a pixel array for optimizing a dual conversion gain operation of pixels sharing a floating diffusion region and an image sensor including the same.

An image sensor includes a charge coupled device (CCD) image sensor, a complementary metal-oxide semiconductor (CMOS) image sensor (CIS), etc. The CMOS image sensor may include pixels composed of CMOS transistors. Those pixels may convert light energy into an electrical signal by using a photoelectric conversion element included in each pixel. The CMOS image sensor may obtain information about a captured/photographed image by using the electrical signal generated by each pixel.

Nowadays, the 2RSR (2 Row Simultaneously Read) technique for simultaneously performing a readout operation on two rows during one 1H period being a readout unit is used to minimize the 1H period. In a case of multi-pixels, charges from pixels are summed through analog binning together with the 2RSR technique. A dual conversion gain operation for generating HDR image of a high quality may be introduced. However, when the 2RSR technique is used, a low conversion gain operation is not performed normally when the readout operation is simultaneously performed on pixels sharing a floating diffusion region.

SUMMARY

Provided are a pixel array for optimizing a dual conversion gain operation of pixels sharing a floating diffusion region and an image sensor including the same.

According to an aspect of the disclosure, a pixel array includes: a plurality of unit pixel groups; and two column lines provided for each column, wherein each of the unit pixel groups comprises two rows, a first pixel group comprising a plurality of pixels, a second pixel group comprising a plurality of pixels, wherein the first pixel group and the second pixel group are arranged in a row direction, wherein a pixel signal is output by simultaneously reading out: a first set of two unit pixel groups that are connected to a first column line and that do not share a first floating diffusion region, and a second set of two unit pixel groups that are connected to a second column line different from the first column line and that do not share a second floating diffusion region, and wherein at least one of the first floating diffusion region and the second floating diffusion region is between a dual conversion transistor and a reset transistor, the dual conversion transistor and the reset transistor being included in each of the unit pixel groups.

According to an aspect of the disclosure, a pixel array includes: a plurality of unit pixel groups; and a first column line and a second column line provided for each column, wherein each of the plurality of unit pixel groups comprises: a first pixel group located at a first row and comprising a plurality of first color pixels: a second pixel group located at a second row and comprising a plurality of second color pixels: a first floating diffusion region connected to transfer transistors of the first pixel group and the second pixel group: a dual conversion transistor: a reset transistor: a select transistor connected to one of the first column line and the second column line; and a second floating diffusion region connected to the dual conversion transistor and the reset transistor, wherein first two unit pixel groups adjacent to each other from among the plurality of unit pixel groups share the second floating diffusion region, and wherein a pixel signal is output by simultaneously reading out: second two unit pixel groups that are connected to the first column line and that do not share the second floating diffusion region, and third two unit pixel groups that are connected to the second column line and that do not share the second floating diffusion region.

According to another aspect of the disclosure, an image sensor includes: a pixel array comprising two column lines for each column and configured to output a pixel signal from a plurality of unit pixel groups: a row driver configured to control each row of the pixel array; and an analog-to-digital converting (ADC) circuit configured to convert the pixel signal into a digital signal, wherein each of the unit pixel groups comprises two rows, a first pixel group comprising a plurality of pixels, a second pixel group comprising a plurality of pixels, wherein the first pixel group and the second pixel group are arranged in a row direction, wherein the pixel signal is output by simultaneously reading out: a first set of two unit pixel groups that are connected to a first column line and that do not share a floating diffusion region, and a second set of two unit pixel groups that are connected to a second column line different from the first column line and that do not share a floating diffusion region, and wherein the floating diffusion region is between a dual conversion transistor and a reset transistor, the dual conversion transistor and the reset transistor being included in each of the unit pixel groups.

BRIEF DESCRIPTION OF THE DRAWINGS

The above and other aspects and features of the disclosure will become apparent by describing in detail embodiments thereof with reference to the accompanying drawings, in which.

DETAILED DESCRIPTION

Below, embodiments of the disclosure will be described in detail with reference to the drawings.

In the detailed description, components described with reference to the terms "part", "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
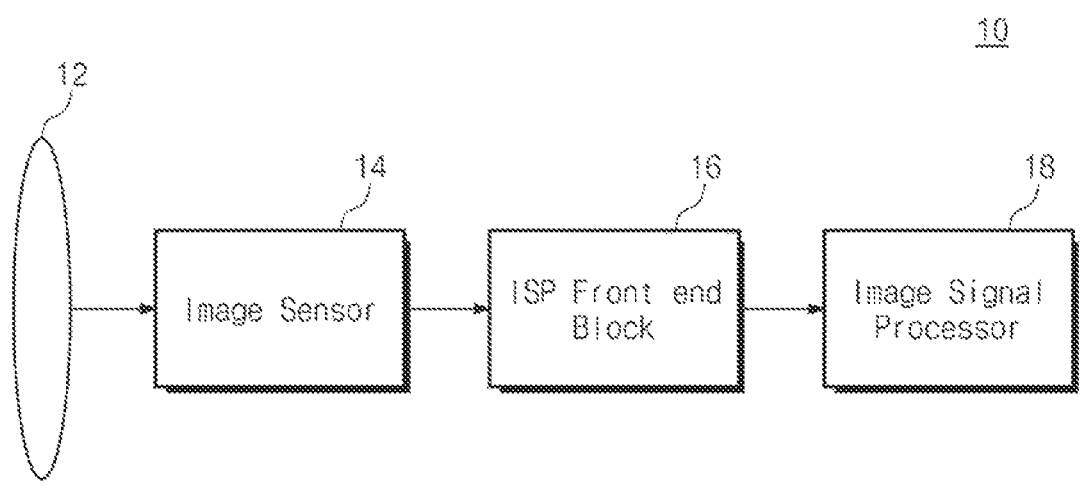
FIG. 1 illustrates an example of a configuration of an image processing system according to an embodiment of the disclosure.

FIG. 1 illustrates an example of a configuration of an image processing system 10 according to an embodiment of the disclosure. The image processing system 10 may be implemented as a part of various electronic devices such as a smartphone, a digital camera, a laptop computer, and a desktop computer. The image processing system 10 may include a lens 12, an image sensor 14, an image signal processor (ISP) front end block 16, and an image signal processor 18.

A light may be reflected by an object, a scenery, etc. targeted for photographing, and the lens 12 may receive the reflected light. The image sensor 14 may generate an electrical signal based on the light received through the lens 12. In an embodiment, the image sensor 14 may be implemented with a complementary metal oxide semiconductor (CMOS) image sensor. In an embodiment, the image sensor 14 may be a multi-pixel image sensor having a dual pixel structure or a tetracell structure.

In an embodiment, the image sensor 14 may include a pixel array. Pixels of the pixel array may convert a light into electrical signals and may generate pixel values. A ratio at which a light is converted into an electrical signal (e.g., a voltage) may be defined as "conversion gain". In particular, the pixel array may generate pixel signals under a 'low' conversion gain condition and a 'high' conversion gain condition, by using a 'dual' conversion gain in which a conversion gain changes.

In an embodiment, the image sensor 14 may include an analog-to-digital converting (ADC) circuit for performing a correlated double sampling (CDS) operation on the pixel values. A configuration of the image sensor 14 will be described in detail with reference to FIG. 2.

The ISP front end block 16 may perform pre-processing on the electrical signals output from the image sensor 14 so as to be appropriate for processing of the image signal processor 18.

The image signal processor 18 may generate image data associated with the photographed object, scenery, etc. by appropriately processing the electrical signals processed by the ISP front end block 16. To this end, the image signal processor 18 may perform various processing such as color correction, auto white balance, gamma correction, color saturation correction, bad pixel correction, and hue correction.

FIG. 1 shows one lens 12 and one image sensor 14. However, in another embodiment, the image processing system 10 may include a plurality of lenses, a plurality of image sensors, and a plurality of ISP front end blocks. In this case, the plurality of lenses may have different fields of view. In an embodiment, the plurality of image sensors may have different functions, different performances, and/or different characteristics and may include pixel arrays of different configurations.

Figure 2:
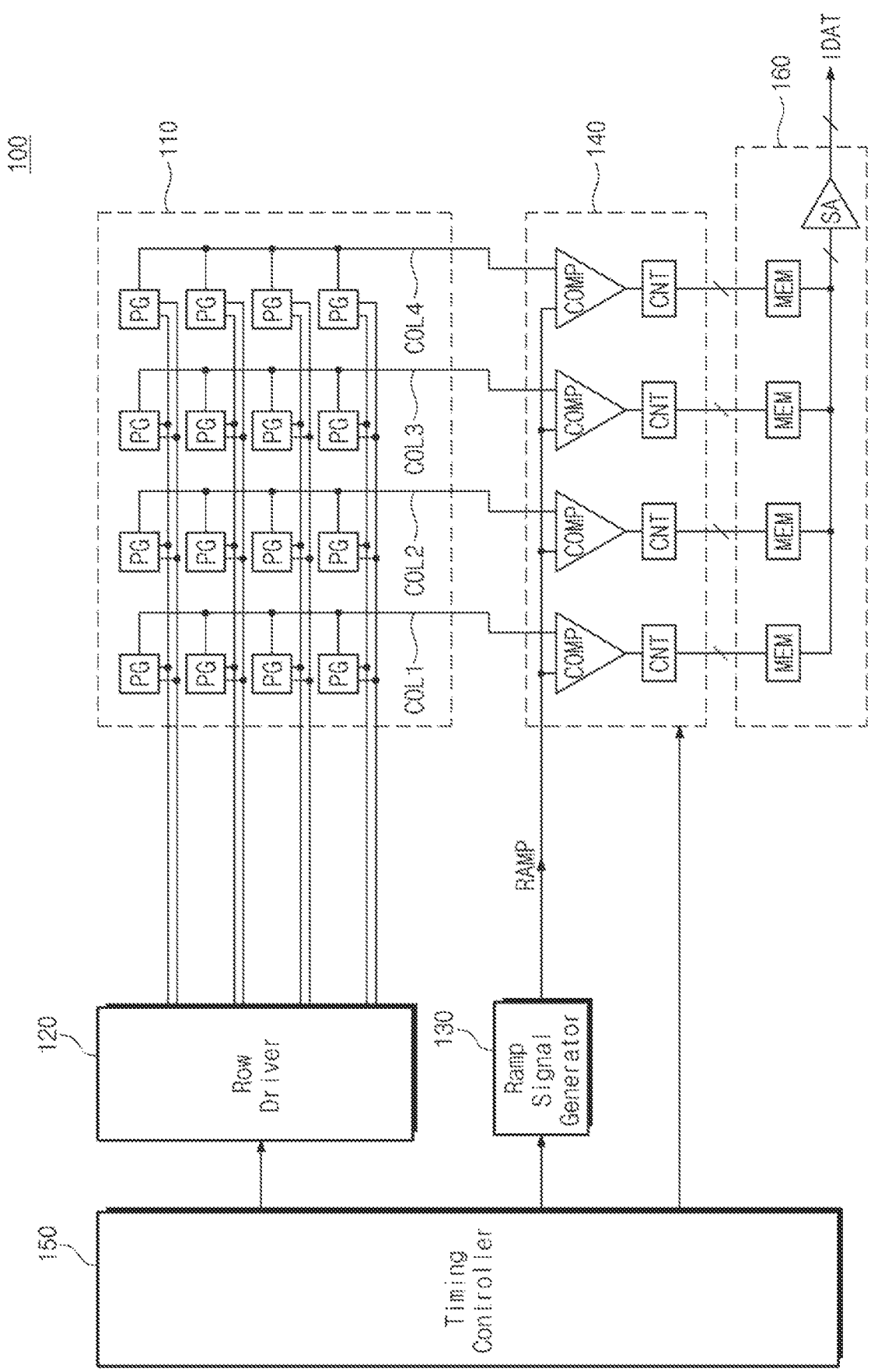
FIG. 2 illustrates an example of a configuration of an image sensor of FIG. 1.

FIG. 2 illustrates an example of a configuration of the image sensor 14 of FIG. 1. An image sensor 100 may include a pixel array 110, a row driver 120, a ramp signal generator 130, an ADC circuit 140, a timing controller 150, and a buffer 160.

The pixel array 110 may include a plurality of pixels arranged in the form of a matrix, that is, are arranged along rows and columns. Each of the plurality of pixels may include a photoelectric conversion element. In an embodiment, the photoelectric conversion element may include a photodiode, a photo transistor, a photo gate, or a pinned photodiode.

The pixel array 110 may include a plurality of pixel groups PG. Each of the pixel groups PG may include two or more pixels. A plurality of pixels constituting a pixel group may share one floating diffusion region or a plurality of floating diffusion regions. FIG. 2 illustrates an example in which the pixel array 110 includes the pixel groups PG arranged in the form of a matrix with four rows and four columns (i.e., includes 4×4 pixel groups PG). However, embodiments of the disclosure are not limited thereto.

The pixel group PG may include pixels of the same color. In one embodiment, the pixel group PG may include a 'red' pixel to convert a light of a 'red' spectrum into an electrical signal, a 'green' pixel to convert a light of a 'green' spectrum into an electrical signal, or a 'blue' pixel to convert a light of a 'blue' spectrum into an electrical signal. In an embodiment, the pixels constituting the pixel array 110 may be arranged in the form of a tetra-Bayer pattern. In an embodiment a micro lens and a color filter may be stacked on or over each pixel. With regard to the light incident through the micro lens, the color filter may transmit a light of a specific color, that is, a wavelength of a specific color region. A color that the pixel is capable of detecting may be determined based on the color filter provided in the pixel.

The pixels of the pixel array 110 may output the pixel signals to the ADC circuit 140 through column lines of columns COL1 to COL4, depending on the intensity or the amount of light incident from the outside. In an embodiment, the pixel signal may be an analog signal corresponding to the intensity or the amount of light incident from the outside. In an embodiment, each of the columns COL1 to COL4 may include two column lines. In an embodiment, in the pixel array 110, the half of a plurality of pixels disposed on one column may be connected to one column line, and the other half thereof may be connected to the other column line. In an embodiment, in the readout operation, the pixel array 110 may perform 'analog binning' on pixel signals so as to be output to the ADC circuit 140; the image sensor 100 may include multiplexers for performing analog binning.

The pixels of the pixel array 110 may be classified into active pixels and dummy pixels. The pixels of the pixel groups PG (illustrated in FIG. 2) may be the active pixels, and the dummy pixels may be located to be adjacent to the edge of the pixel array 110, that is, the boundary for the active pixels. The active pixels may receive the light reflected from an object and may convert the received light into electrical signals. The dummy pixels may be shielded from an external light and may generate dark currents depending on a given factor (e.g., a temperature) regardless of a light.

The row driver 120 may select and drive a row of the pixel array 110. The row driver 120 may decode an address and/or a control signal generated by the timing controller 150 and may generate control signals for selecting and driving a row of the pixel array 110. In one embodiment, the control signals may include a signal for selecting a pixel, a signal for resetting a floating diffusion region, or other signals. In particular, the pixel array 110, according to an embodiment of the disclosure, may simultaneously read out pixels located at two rows, and the row driver 120 may select and drive two rows to be read out simultaneously.

The ramp signal generator 130 may generate a ramp signal RAMP under the control of the timing controller 150. In an embodiment, the ramp signal generator 130 may operate in response to a control signal such as a ramp enable signal. When the ramp enable signal is activated, the ramp signal generator 130 may generate the ramp signal RAMP based on preset values (e.g., a start level, an end level, and a slope). In other words, the ramp signal RAMP may be a signal that increases or decreases along a preset slope during a specific time. The ramp signal RAMP may be provided to the ADC circuit 140.

The ADC circuit 140 may receive pixel signals from a plurality of pixels of the pixel array 110 through column lines and may receive the ramp signal RAMP from the ramp signal generator 130. The ADC circuit 140 may operate based on a 'correlated double sampling' (CDS) technique for obtaining a reset signal and an image signal from the received pixel signal and extracting a difference between the reset signal and the image signal as an effective signal component. The ADC circuit 140 may include a plurality of comparators COMP and a plurality of counters CNT.

In an embodiment, each of the comparators COMP may perform correlated double sampling (CDS) by comparing the reset signal of the pixel signal and the ramp signal RAMP and comparing the image signal of the pixel signal and the ramp signal RAMP. Each of the counters CNT may count pulses of the signal experiencing the correlated double sampling and may output a counting result as a digital signal. An example in which the ADC circuit 140 includes four comparators COMP and four counters CNT is illustrated in FIG. 2, but embodiments of the disclosure are not limited thereto.

The timing controller 150 may generate a control signal and/or a clock for controlling an operation and/or a timing of each of the row driver 120, the ramp signal generator 130, and the ADC circuit 140.

The buffer 160 may include memories MEM and a sense amplifier SA. The memories MEM may store digital signals output from the corresponding counters CNT of the ADC circuit 140. The sense amplifier SA may sense and amplify the digital signals stored in the memories MEM. The sense amplifier SA may output the amplified digital signals as image data IDAT, and the image data IDAT may be provided to the ISP front end block 16 of FIG. 1.

Figure 3:
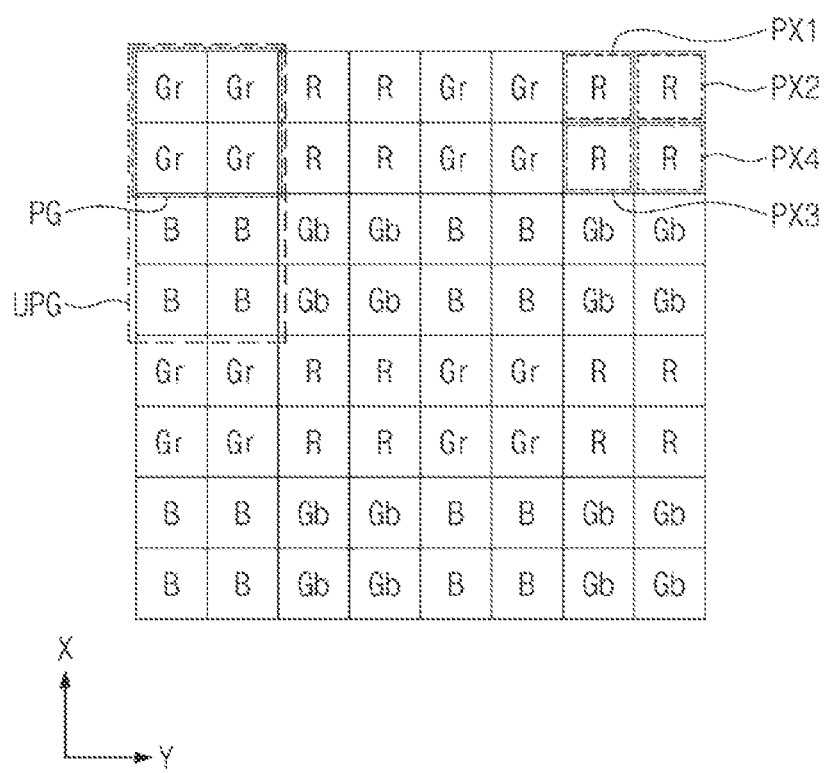
FIG. 3 illustrates an example of a configuration of a pixel array of FIG. 2.

FIG. 3 illustrates an example of a configuration of the pixel array 110 of FIG. 2. In FIG. 3, the plurality of pixel groups PG of the pixel array 110 may include a plurality of green pixels Gr and Gb, a plurality of blue pixels "B", and a plurality of red pixels "R". In an embodiment, two green pixels Gr and Gb, one blue pixel "B", and one red pixel "R" may be disposed in the form of a 2×2 matrix, and two green pixels Gr and Gb may be disposed in a diagonal direction.

The above pixel pattern (i.e., a tetra-Bayer pattern) may be repeatedly disposed in the pixel array 110.

Each of the plurality of pixel groups PG of the pixel array 110 may include a first pixel PX1, a second pixel PX2, a third pixel PX3, and a fourth pixel PX4 of the same color. As shown in FIG. 3, the first pixel PX1 may be disposed on the left top of the pixel group PG, the second pixel PX2 may be disposed on the right top of the pixel group PG, the third pixel PX3 may be disposed on the left bottom of the pixel group PG, and the fourth pixel PX4 may be disposed on the right bottom of the pixel group PG. In other words, the first pixel PX1 and the second pixel PX2 may be disposed side by side in the X-axis direction, the third pixel PX3 and the fourth pixel PX4 may be disposed side by side in the X-axis direction, the first pixel PX1 and the third pixel PX3 may be disposed side by side in the Y-axis direction, and the second pixel PX2 and the fourth pixel PX4 may be disposed side by side in the Y-axis direction.

In an embodiment, the pixel array 110 may be divided into a plurality of unit pixel groups UPG. The unit pixel group UPG may include two pixel groups PG disposed adjacent to each other in the Y-axis direction. That is, the unit pixel group UPG may include the pixel groups PG including the green pixels Gr and the blue pixels "B" or may include the pixel groups PG including the red pixels "R" and the green pixel Gb. The pixel groups PG constituting the unit pixel group UPG may share a first floating diffusion region (e.g., a first floating diffusion region FD1 of FIG. 4), and the unit pixel groups UPG adjacent to each other in the Y-axis direction may share a second floating diffusion region (e.g., a second floating diffusion region FD2 of FIG. 4). The unit pixel group UPG may be a pixel unit for performing the readout operation according to an embodiment of the disclosure, and an example of the readout operation will be described in detail with reference to FIG. 5.

Figure 4:
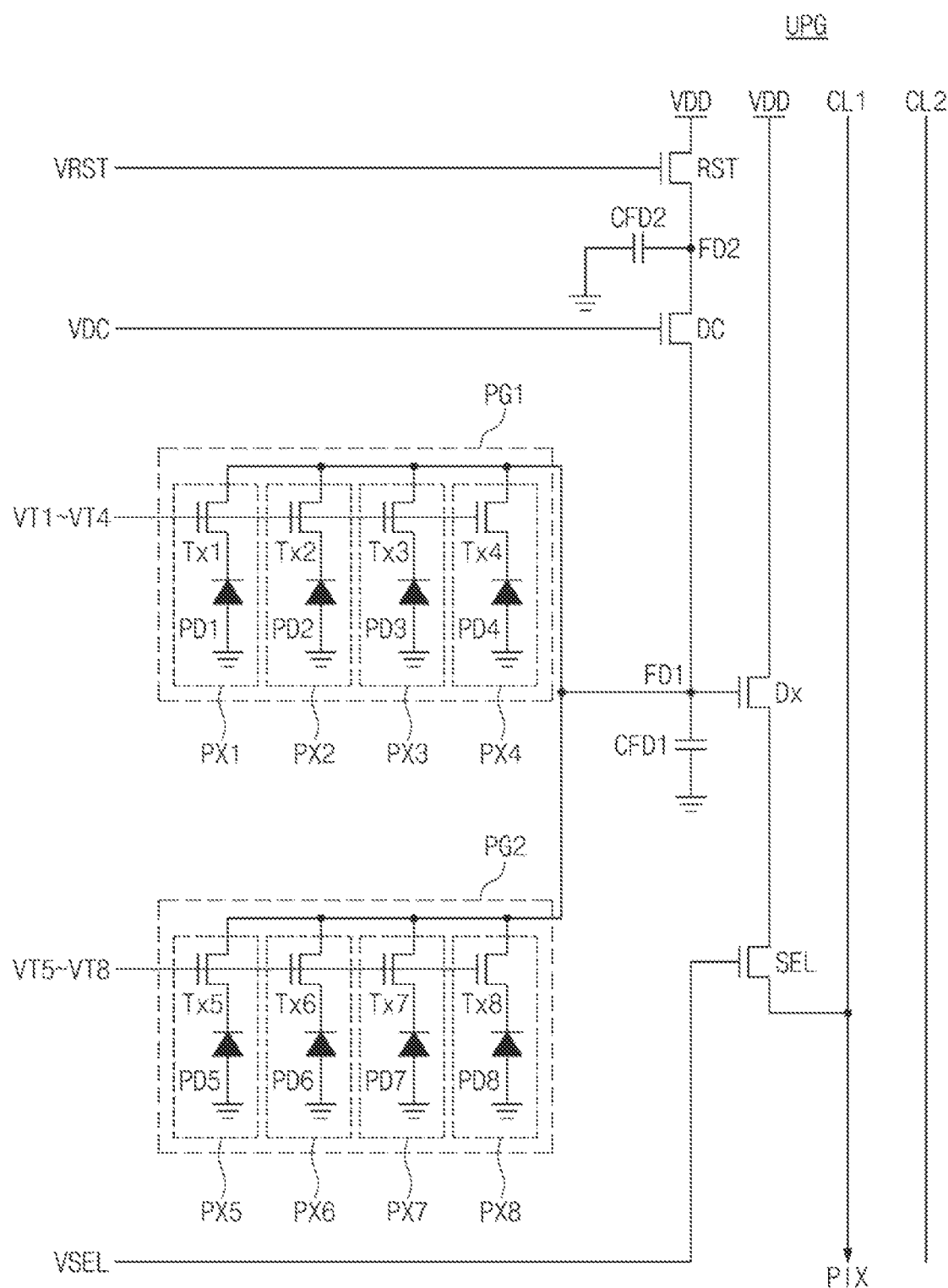
FIG. 4 illustrates a unit pixel group of a pixel array of FIG. 2.

FIG. 4 is a circuit diagram illustrating the unit pixel group UPG of the pixel array 110 of FIG. 2. In FIG. 4, the unit pixel group UPG may include a pixel group PG1 (including the first pixel PX1, the second pixel PX2, the third pixel PX3, and the fourth pixel PX4), a pixel group PG2 (including a fifth pixel PX1, a sixth pixel PX2, a seventh pixel PX3, and an eighth pixel PX4), a reset transistor RST, a dual conversion transistor DC, a drive transistor Dx, and a select transistor SEL. In an embodiment, the first pixel group PG1 may include the plurality of green pixels "Gr," and the second pixel group PG2 may include the plurality of blue pixels "B". Alternatively, the first pixel group PG1 may include the plurality of red pixels "R", and the second pixel group PG2 may include the plurality of green pixels "Gb."

In the pixel groups PG1 and PG2, the first pixel PX1 may include a first photoelectric conversion element PD1 and a first transfer transistor Tx1, and each of the remaining pixels PX3 to PX8 may also include similar components/elements. The pixel groups PG1 and PG2 may share the reset transistor RST, the dual conversion transistor DC, the drive transistor Dx, and the select transistor SEL. In an embodiment, the pixels PG1 and PG2 may share the first floating diffusion region FD1.

The first floating diffusion region FD1 or the second floating diffusion region FD2 may accumulate charges corresponding to the amount of incident light. While the transfer transistors Tx1, Tx2, Tx3, Tx4, Tx5, Tx6, Tx7, and Tx8 are respectively turned on by transfer signals VT1 and VT8, the first floating diffusion region FD1 or the second floating diffusion region FD2 may accumulate charges supplied from the photoelectric conversion elements PD1 to PD8. Because the first floating diffusion region FD1 is connected to the gate terminal of the drive transistor Dx operating as a source follower amplifier, a voltage corresponding to the amount of charges accumulated at the first floating diffusion region FD1 may be formed. In one embodiment, a capacitance of the first floating diffusion region FD1 is depicted as a first capacitance CFD1.

In FIG. 4, the dual conversion transistor DC may be driven by a dual conversion signal VDC. When the dual conversion transistor DC is turned off, the capacitance of the first floating diffusion region FD1 may correspond to the first capacitance CFD1. In a normal environment, because the first floating diffusion region FD1 is not easily saturated, there is no need to increase the capacitance (i.e., CFD1) of the first floating diffusion region FD1. In this case, the dual conversion transistor DC may be turned off. The conversion gain corresponding to the case where the dual conversion transistor DC is 'turned off' is referred to as a "high conversion gain".

However, in a high-illuminance environment, the first floating diffusion region FD1 may be easily saturated. To prevent the saturation, the dual conversion transistor DC may be 'turned on' such that the first floating diffusion region FD1 and the second floating diffusion region FD2 are electrically connected. In this case, a capacitance of the first the floating diffusion region FD1 and the second floating diffusion region FD2 may be increased to a sum of the first capacitance CFD1 and a second capacitance CFD2. The conversion gain corresponding to the case where the dual conversion transistor DC is 'turned on' is referred to as a "low conversion gain".

The transfer transistors Tx1, Tx2, Tx3, Tx4, Tx5, Tx6, Tx7, and Tx8 may be respectively driven by the transfer signals VT1, VT2, VT3, VT4, VT5, VT6, VT7, VT8 and may transfer charges generated (or integrated) by the photoelectric conversion elements PD1 to PD8 to the first floating diffusion region FD1 or the second floating diffusion region FD2. In one embodiment, first ends of the transfer transistors Tx1, Tx2, Tx3, Tx4, Tx5, Tx6, Tx7, and Tx8 may be respectively connected to the photoelectric conversion elements PD1 to PD8, and second ends thereof may be connected in common to the first floating diffusion region FD1.

In FIG. 4, the reset transistor RST may be driven by a reset control signal VRST and may provide a power supply voltage VDD to the first floating diffusion region FD1 or the second floating diffusion region FD2. As such, the charges accumulated at the first floating diffusion region FD1 or the second floating diffusion region FD2 may move to a terminal for the power supply voltage VDD, and a voltage of the first floating diffusion region FD1 or the second floating diffusion region FD2 may be reset.

The drive transistor Dx may amplify a voltage of the first floating diffusion region FD1 or the second floating diffusion region FD2 to generate a pixel signal PIX. The select transistor SEL may be driven by a selection signal VSEL and may select pixels to be read in units of row. The select transistor SEL may be connected to one of two column lines CL1 and CL2 that each column includes. In one embodiment, the select transistor SEL of the unit pixel group UPG illustrated in FIG. 4 is connected to the first column line CL1, and unit pixel groups present at the same column as the unit pixel group UPG of FIG. 4 may be connected to the second column line CL2. When the select transistor SEL is turned on, the pixel signal PIX may be output to the ADC circuit 140 of FIG. 2 through the first column line CL1.

Figure 5:
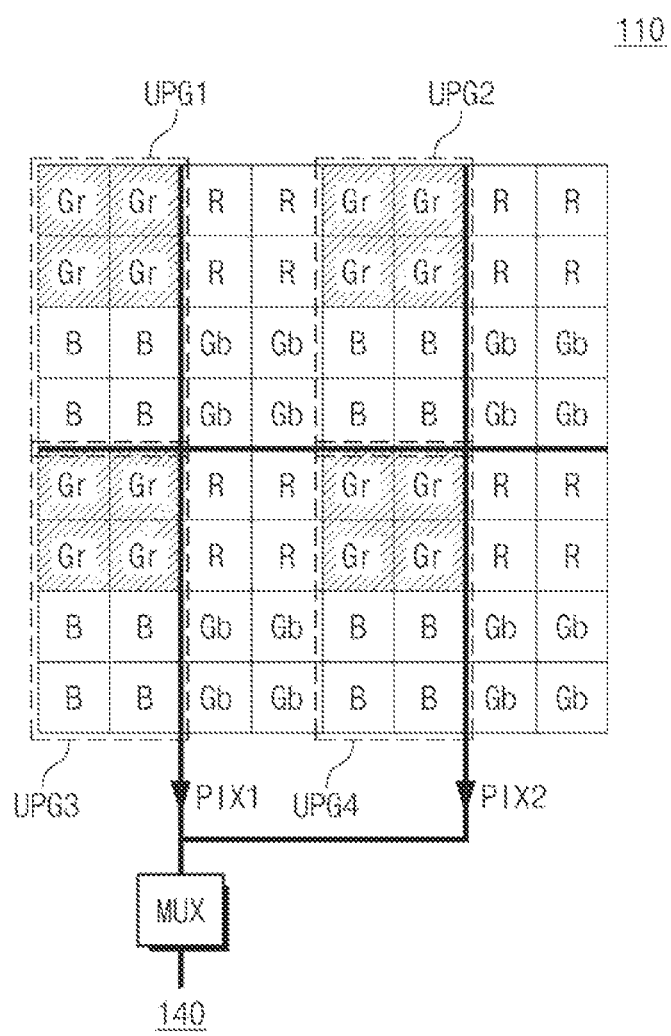
FIG. 5 illustrates an example of a pixel readout operation of a pixel array FIG. 2.

FIG. 5 illustrates an example of a pixel readout operation of the pixel array 110 of FIG. 2. The first unit pixel group UPG1, the second unit pixel group UPG2, the third unit pixel group UPG3, and fourth unit pixel group UPG4 are illustrated in FIG. 5. The readout operation of the green pixels Gr of each of the first unit pixel group UPG1, the second unit pixel group UPG2, the third unit pixel group UPG3, and the fourth unit pixel group UPG4 will be described as an example. First, values (e.g., charges generated from photoelectric conversion elements) of the green pixels Gr of the first unit pixel group UPG1) may be summed. At the same time, values of the green pixels Gr of the third unit pixel group UPG3 connected to the same column line as the first unit pixel group UPG1 are summed. A sum of the values of the green pixels Gr of the first unit pixel group UPG1 and the third unit pixel group UPG3 is output as a first pixel signal PIX1. Also, at the same time, a sum of values of the green pixels Gr of the second unit pixel group UPG2 and the fourth unit pixel group UPG4 that are respectively located at the same rows as the first unit pixel group UPG1 and the third unit pixel group UPG3 and are connected to the same column line is output as a second pixel signal PIX2.

As shown in FIG. 5, the pixel array 110 may output a result of performing analog binning on the first pixel signal PIX1 and the second pixel signal PIX2 through a multiplexer MUX to the ADC circuit 140 of FIG. 2. In an embodiment, as described above, because each column of the pixel array 110 includes two column lines, the pixel array 110 may perform the same readout operation even on the green pixels Gr that are located at rows different from the rows illustrated in FIG. 5 and are connected to different column lines.

That is, according to an embodiment of the disclosure, the pixel array 110 may simultaneously read out pixels of the same color located at plural rows by using analog binning. The readout operation of the green pixels Gr of the first unit pixel group UPG1, the second unit pixel group UPG2, the third unit pixel group UPG3, and the fourth unit pixel group UPG4 is described with reference to FIG. 5; however, in the first unit pixel group UPG1, the second unit pixel group UPG2, the third unit pixel group UPG3, and the fourth unit pixel group UPG4, the readout operation of the blue pixels "B", the readout operation of the red pixels "R", and the readout operation of the green pixels Gb are the same as the readout operation of the green pixels Gr. An example in which the first unit pixel group UPG1 and the third unit pixel group UPG3 are adjacent to each other and the second unit pixel group UPG2 and the fourth unit pixel group UPG4 are adjacent to each other is illustrated in FIG. 5, but embodiments of the disclosure are not limited thereto. In one embodiment, the pixel array 110 may simultaneously read out unit pixel groups that are connected to the same column line and are not adjacent to each other.

Figure 6:
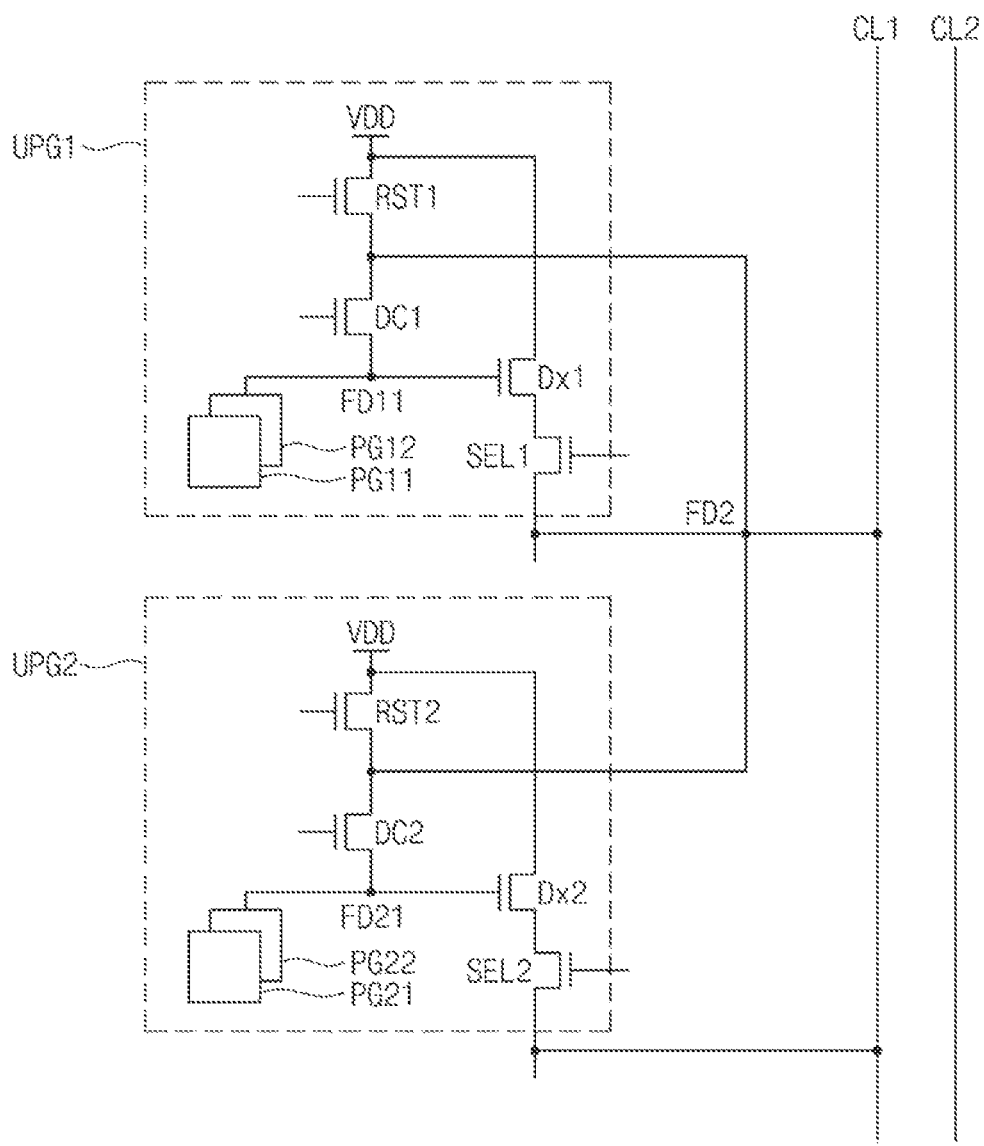
FIG. 6 illustrates two adjacent unit pixel groups of a pixel array of FIG. 2, which share a second floating diffusion region.

FIG. 6 is a circuit diagram illustrating two unit pixel groups UPG1 and UPG2 of the pixel array 110, which share the second floating diffusion region FD2. In FIG. 6, the pixel groups PG11 and PG12 share a first portion of a first floating diffusion region FD11. The pixel groups PG21 and PG22 share a second portion of the first floating diffusion region FD21. The first unit pixel group UPG1 and the second unit pixel group UPG2 share the second floating diffusion region FD2. As described with reference to FIG. 4, charges that are generated from photoelectric conversion elements of pixels under the low conversion gain condition where dual conversion transistors DC1 and DC2 are turned on may be transferred to the second floating diffusion region FD2. Also, an example in which both the first unit pixel group UPG1 and the second unit pixel group UPG2 are connected to the first column line CL1 is illustrated in FIG. 6, and other unit pixel groups not illustrated in FIG. 6 may be connected to the second column line CL2. Operations of reset transistors RST1 and RST2, the dual conversion transistors DC1 and DC2, drive transistors Dx1 and Dx2, select transistors SEL1 and SEL2 and signals for controlling the transistors are the same as those described with reference to FIG. 4, and thus, additional description will be omitted to avoid redundancy.

In one embodiment, when the readout operation described with reference to FIG. 5 is performed under the low conversion gain condition, charges stored at the second floating diffusion region FD2 shared by the first unit pixel group UPG1 and the second unit pixel group UPG2 may be simultaneously read out. In this case, as the amount of introduced charges is twice a charge capacity set to correspond to the low conversion gain condition, an actually available charge capacity may be halved, and the conversion gain is doubled. This may mean that the pixel readout operation of the low conversion gain condition is not performed properly in a low-illuminance environment. To prevent the above issue, the pixel array 110 of the disclosure may be implemented to simultaneously read out unit pixel groups 'not sharing' the second floating diffusion region FD2, instead of simultaneously reading out unit pixel groups 'sharing' the second floating diffusion region FD2.

Figure 7:
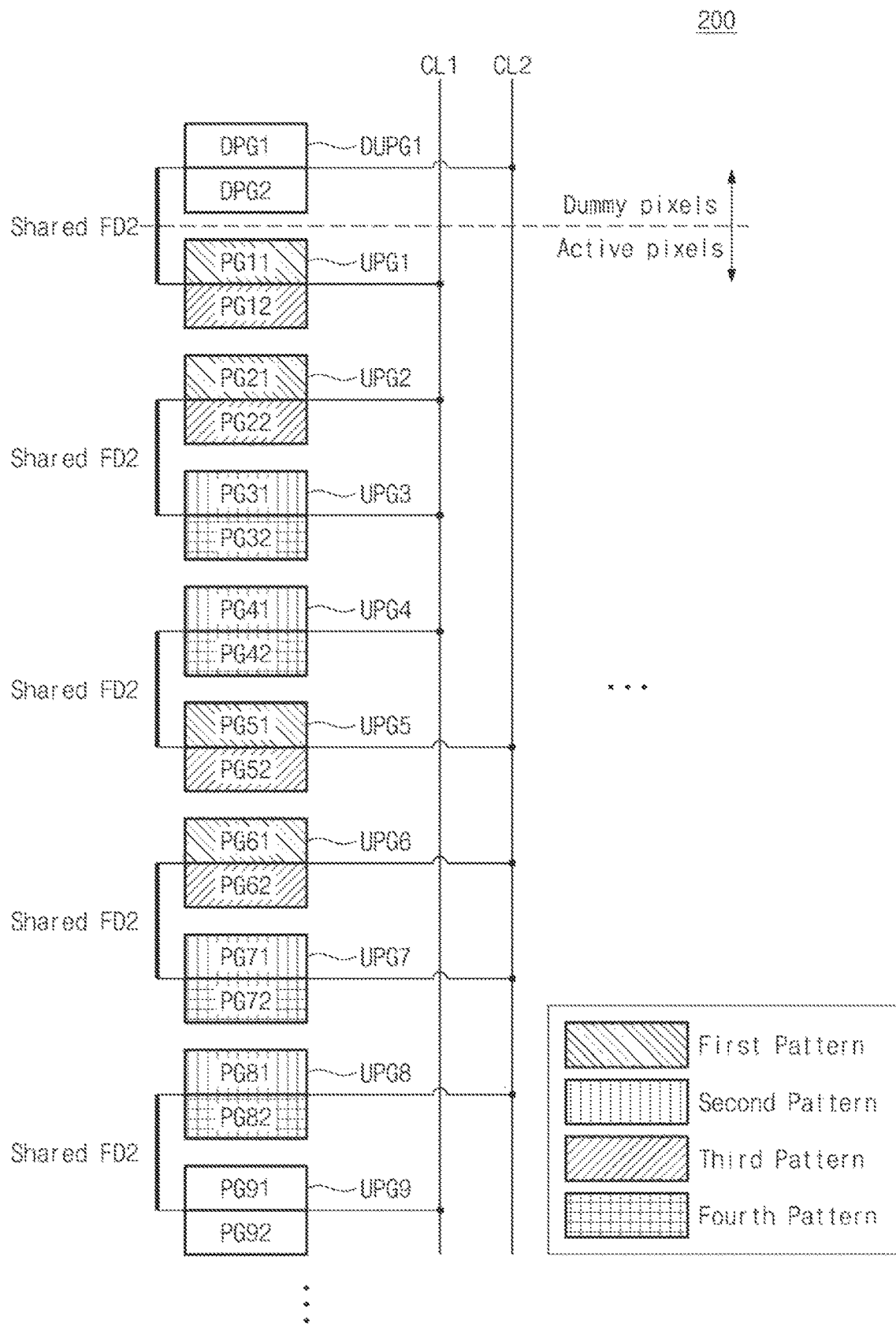
FIG. 7 illustrates a configuration of a pixel array of FIG. 2 for simultaneously reading out unit pixel groups not sharing a second floating diffusion region, according to an embodiment of the disclosure.

FIG. 7 illustrates a configuration of the pixel array 110 of FIG. 2 for simultaneously reading out unit pixel groups not sharing the second floating diffusion region FD2, according to an embodiment of the disclosure. Referring to FIG. 7, a pixel array 200 may include a dummy unit pixel group DUPG1 composed of dummy pixels and a plurality of unit pixel groups UPG1 to UPG12 composed of active pixels. Herein, the dummy unit pixel group DUPG1 is a unit pixel group composed of dummy pixels adjacent to active pixels from among the dummy pixels, and the first unit pixel group UPG1 is a unit pixel group including active pixels located at the first row from among the active pixels.

In FIG. 7, a bold solid line indicates that the second floating diffusion region FD2 is shared. That is, the dummy unit pixel group DUPG1 and the first unit pixel group UPG1 may share the second floating diffusion region FD2, and each of the remaining unit pixel groups UPG2 to UPG12 may also share the second floating diffusion region FD2 with the corresponding unit pixel group. In one embodiment, the unit pixel groups UPG1 to UPG4 and UPG9 to UPG12 may be connected to the first column line CL1, and the unit pixel groups UPG5 to UPG8 may be connected to the second column line CL2.

In one embodiment, during the first 1H period (shown in FIG. 8), the pixel array 200 may read out first pixel groups PG11 and PG21 of the first unit pixel group UPG1 and the second unit pixel group UPG2 connected to the first column line CL1. At the same time, the pixel array 200 may read out first pixel groups PG51 and PG61 of the fifth unit pixel group UPG5 and the sixth unit pixel group UPG6 that are spaced from the second unit pixel group UPG2 as much as two unit pixel groups and are connected to the second column line CL2 (refer to boxes with first pattern). As in the first 1H period, during the second 1H period, the pixel array 200 may read out second pixel groups PG12, PG22, PG52, and PG62 (refer to boxes with third pattern). During the third 1H period, the pixel array 200 may read out first pixel groups PG31, PG41, PG71, and PG81 (refer to boxes with second pattern); during the fourth 1H period, the pixel array 200 may read out second pixel groups PG32, PG42, PG72, and PG82 (refer to boxes with fourth pattern).

According to an embodiment of the disclosure, the pixel array 200 is configured such that a unit pixel group (e.g., DUPG1) including the last row of dummy pixels and a unit pixel group (e.g., UPG1) including the first row of active pixels share the second floating diffusion region FD2, four unit pixel groups (e.g., UPG1 to UPG4) are sequentially connected to the first column line CL1, and four unit pixel groups (e.g., UPG5 to UPG8) are sequentially connected to the second column line CL2. According to the above configuration, the pixel array 200 may simultaneously read out two unit pixel groups connected to the first column line CL1 and two unit pixel groups connected to the second column line CL2 during the 1H time at intervals equal to two unit pixel groups (not targeted for the readout operation and connected to the column line CL1/CL2) interposed therebetween. As such, unit pixel groups sharing the second floating diffusion region FD2 may not be simultaneously read out.

In other words, according to the above configuration of the pixel array 200, because one unit pixel group is not read out when the other unit pixel group sharing the second floating diffusion region FD2 with the one unit pixel group is read out, charges may not be accumulated by double at the second floating diffusion region FD2 in the low conversion gain mode. This may mean that the readout operation is accurately performed even in the low conversion gain mode. In an embodiment, only one column is illustrated in FIG. 7. However, as described with reference to FIG. 5, other columns of pixel groups that have the same colors as the pixel groups of the column illustrated in FIG. 7 may also be read out to be identical to the above manner, and readout results of pixel groups of the same color present at different columns may be summed through analog binning.

Figure 8:
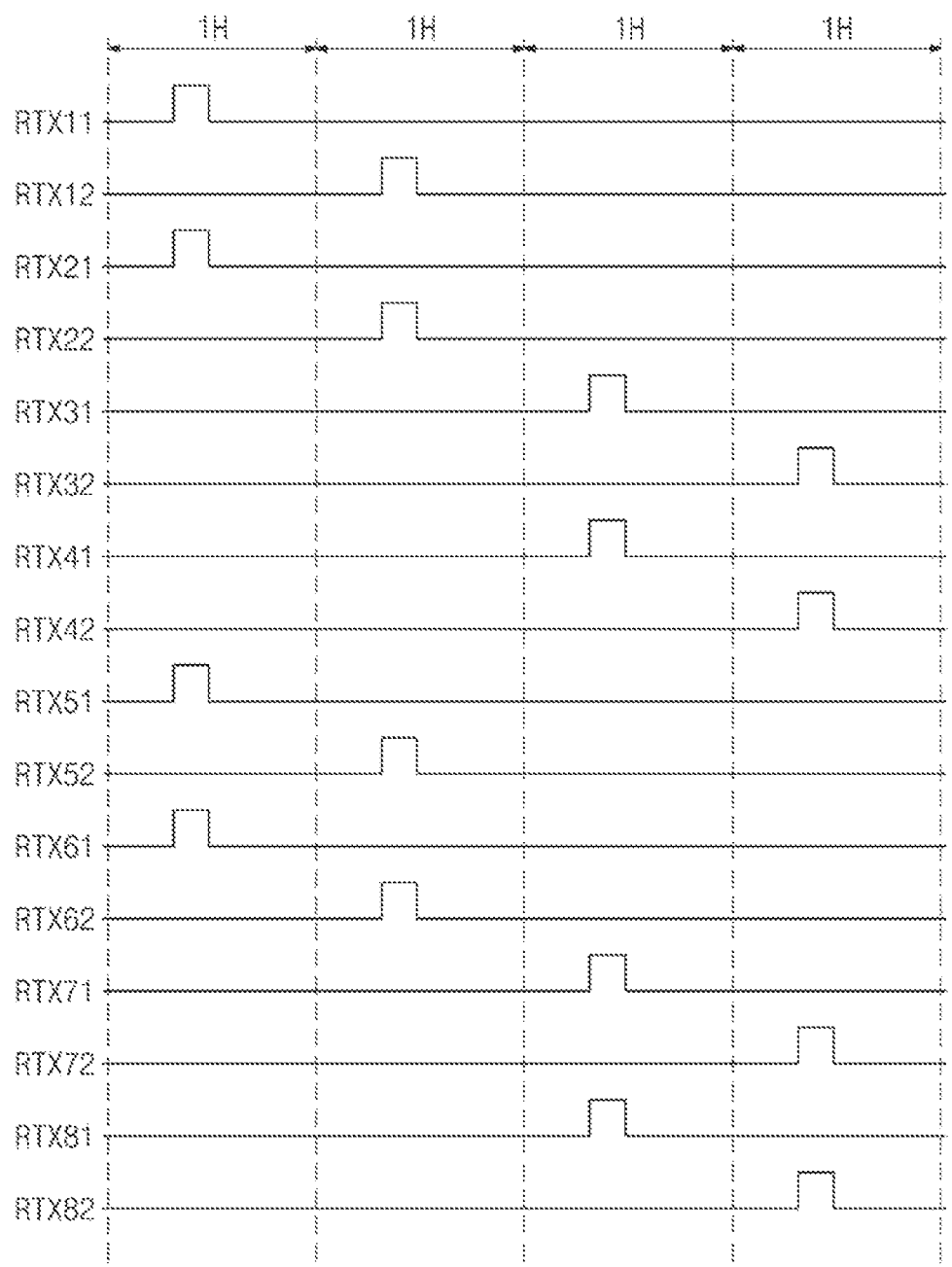
FIG. 8 illustrates a pixel readout operation of a pixel array FIG. 7.

FIG. 8 is a timing diagram illustrating a pixel readout operation of the pixel array 200 of FIG. 7. Referring to FIG. 8, the pixel groups PG11, PG21, PG51, and PG61 are read out in the first 1H time, the pixel groups PG12, PG22, PG52, and PG62 are read out in the second 1H time, the pixel groups PG31, PG41, PG71, and PG81 are read out in the third 1H time, and the pixel groups PG32, PG42, PG72, and PG82 are read out in the fourth 1H time. Transfer transistors (e.g., four transfer transistors) of pixel groups targeted for readout may be turned on in response to readout transfer pulses RTX11 to RTX82 of the high level and may transfer charges to floating diffusion regions. In one embodiment, the readout transfer pulses RTX11 to RTX82 may include transfer signals (e.g., VT1, VT2, VT3, VT4, VT5, VT6, VT7, VT8 of FIG. 4), respectively, corresponding to transfer transistors included in each of the pixel groups.

Figure 9:
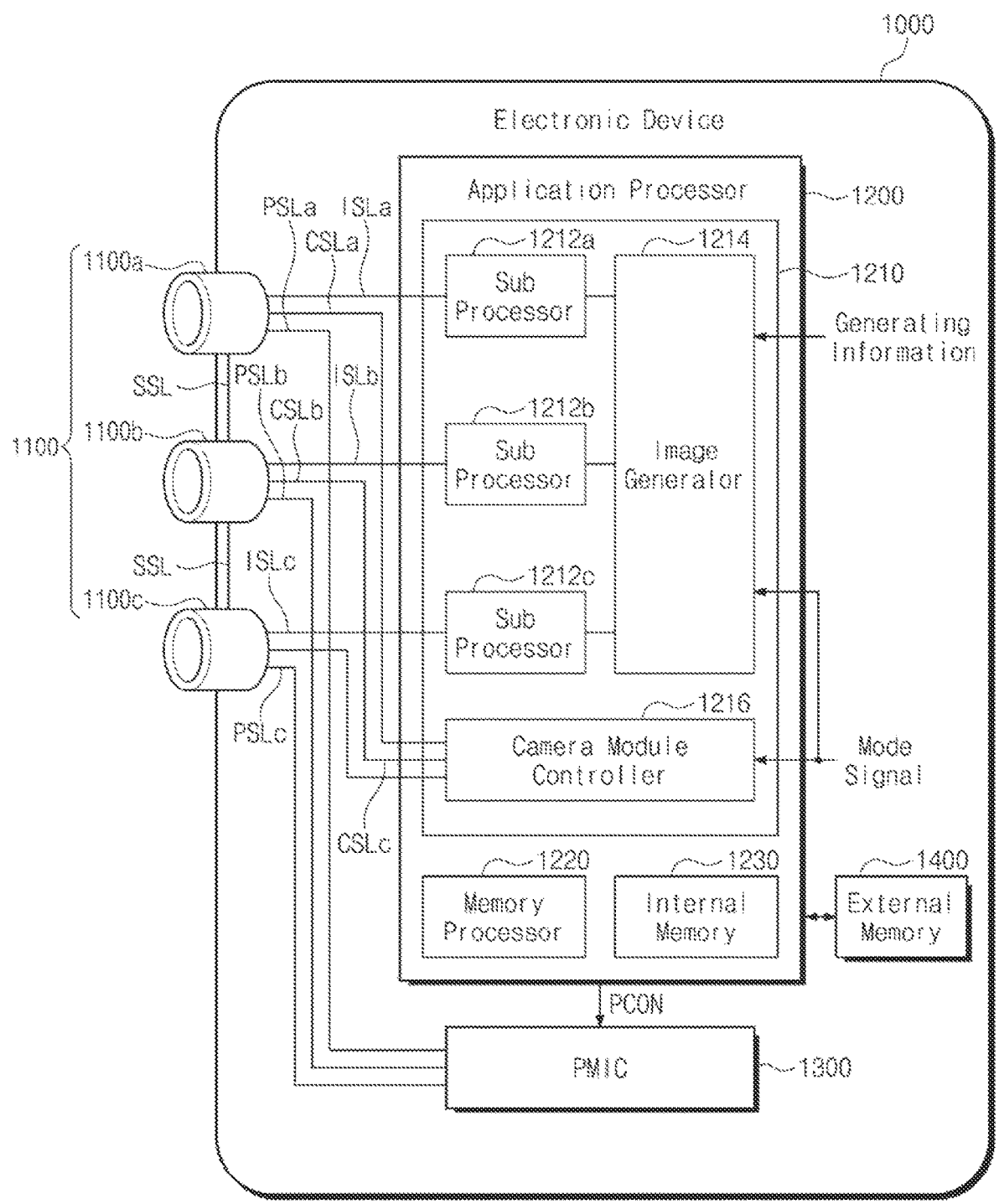
FIG. 9 illustrates an example of a configuration of an electronic device including an image sensor according to an embodiment of the disclosure.
Figure 10:
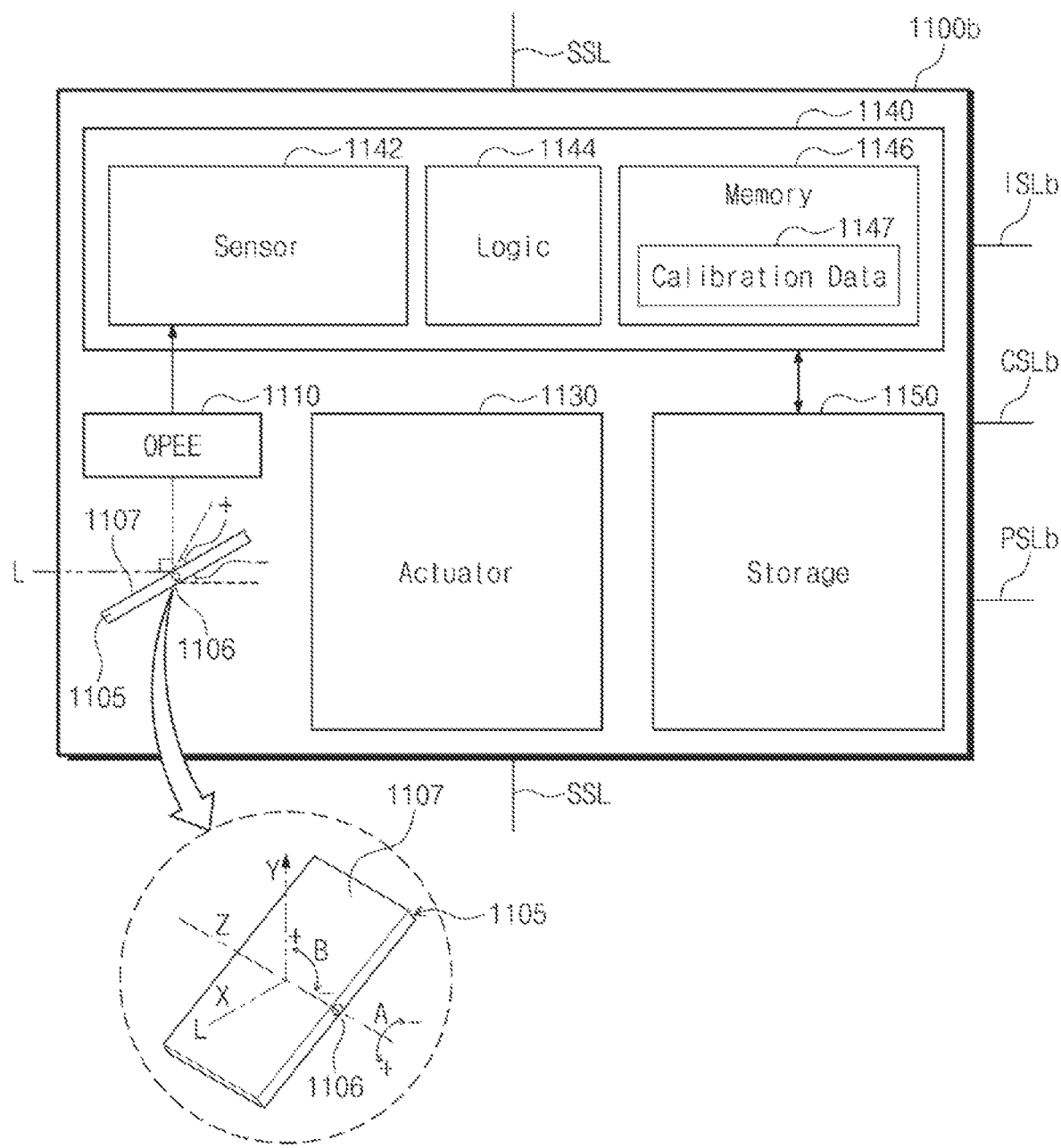
FIG. 10 illustrates an example of a configuration of a camera module of FIG. 9.

FIG. 9 illustrates an example of a configuration of an electronic device 1000 including an image sensor according to an embodiment of the disclosure. FIG. 10 illustrates an example of a configuration of a camera module 1100b of FIG. 9. Referring to FIG. 9, the electronic device 1000 may include a camera module group 1100, an application processor 1200, a PMIC 1300, and an external memory 1400.

The camera module group 1100 may include a plurality of camera modules 1100a, 1100b, and 1100c. An electronic device including three camera modules 1100a, 1100b, and 1100c is illustrated in FIG. 9, but embodiments of the disclosure is not limited thereto. In some embodiments, the camera module group 1100 may be modified to include only two camera modules. In one embodiment, the camera module group 1100 may be modified to include "j" camera modules (j being a natural number of 4 or more).

Below, a detailed configuration of the camera module 1100b will be more fully described with reference to FIG.

10, but the following description may be equally applied to the remaining camera modules 1100a and 1100c.

Referring to FIG. 10, the camera module 1100b may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In some embodiments, the prism 1105 may change a path of the light "L" incident in a first direction (X) to a second direction (Y) perpendicular to the first direction (X), In one embodiment, the prism 1105 may change the path of the light "L" incident in the first direction (X) to the second direction (Y) perpendicular to the first (X-axis) direction by rotating the reflecting plane 1107 of the light reflecting material in direction "A" about a central axis 1106 or rotating the central axis 1106 in direction "B". In this case, the OPFE 1110 may move in a third direction (Z) perpendicular to the first direction (X) and the second direction (Y).

In some embodiments, as illustrated in FIG. 10, a maximum rotation angle of the prism 1105 in direction "A" may be equal to or smaller than 15 degrees in a positive A direction and may be greater than 15 degrees in a negative A direction, but embodiments of the disclosure are not limited thereto.

In some embodiments, the prism 1105 may move within approximately 20 degrees in a positive or negative B direction, between 10 degrees and 20 degrees, or between 15 degrees and 20 degrees: here, the prism 1105 may move at the same angle in the positive or negative B direction or may move at a similar angle within approximately 1 degree.

In some embodiments, the prism 1105 may move the reflecting plane 1107 of the light reflecting material in the third direction (e.g., Z direction) parallel to a direction in which the central axis 1106 extends.

The OPFE 1110 may include optical lenses composed of "m" groups (m being a natural number), for example. Here, "m" lens may move in the second direction (Y) to change an optical zoom ratio of the camera module 1100b. In one embodiment, when a default optical zoom ratio of the camera module 1100b is "Z", the optical zoom ratio of the camera module 1100b may be changed to an optical zoom ratio of 3Z, 5Z, or 5Z or more by moving "m" optical lens included in the OPFE 1110. The OPFE 1110 may further include an optical lens in front of the "m" lenses described above, and the optical lens may be composed of "n" groups (n being a natural number).

The actuator 1130 may move the OPFE 1110 or an optical lens (hereinafter referred to as an "optical lens") to a specific location. In one embodiment, the actuator 1130 may adjust a location of an optical lens such that an image sensor 1142 is placed at a focal length of the optical lens for accurate sensing. The image sensing device 1140 may include the image sensor 1142, control logic 1144, and a memory 1146. The image sensor 1142 may sense an image of a sensing target by using the light "L" provided through an optical lens.

In particular, a pixel array of the image sensor 1142 according to an embodiment of the disclosure may be configured such that pixels sharing a floating diffusion region (e.g., the second floating diffusion region FD2 of FIG. 4) connected to a dual conversion transistor are not simultaneously read out. As such, charges may be prevented from being accumulated at the floating diffusion region by double in a low conversion gain mode, and a readout operation according to a low conversion gain condition set in advance may be normally performed. In other words, a dual conversion gain operation of the image sensor 1142 may be optimized. The control logic 1144 may control overall operations of the camera module 1100b. In one embodiment, the control logic 1144 may control an operation of the camera module 1100b based on a control signal provided through a control signal line CSLb.

The memory 1146 may store information, which is necessary for an operation of the camera module 1100b, such as calibration data 1147. The calibration data 1147 may include information necessary for the camera module 1100b to generate image data by using the light "L" provided from the outside. The calibration data 1147 may include, for example, information about the degree of rotation described above, information about a focal length, information about an optical axis, etc. In the case where the camera module 1100b is implemented in the form of a multi-state camera in which a focal length varies depending on a location of an optical lens, the calibration data 1147 may include a focal length value for each location (or state) of the optical lens and information about auto focusing.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some embodiments, the storage 1150 may be implemented with an electrically erasable programmable read only memory (EEPROM), but embodiments of the disclosure are not limited thereto.

In FIGS. 9 and 10, in some embodiments, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In some embodiments, one camera module (e.g., 1100b) among the plurality of camera modules 1100a, 1100b, and 1100c may be a folded lens shape of camera module in which the prism 1105 and the OPFE 1110 described above are included, and the remaining camera modules (e.g., 1100a and 1100c) may be a vertical shape of camera module in which the prism 1105 and the OPFE 1110 described above are not included; however, embodiments of the disclosure are not limited thereto.

In some embodiments, one camera module (e.g., 1100c) among the plurality of camera modules 1100a, 1100b, and 1100c may be, for example, a vertical shape of depth camera extracting depth information by using an infrared ray (IR). In this case, the application processor 1200 may merge image data provided from the depth camera and image data provided from any other camera module (e.g., 1100a or 1100b) and may generate a three-dimensional (3D) depth image.

In some embodiments, at least two camera modules (e.g., 1100a and 1100b) among the plurality of camera modules 1100a, 1100b, and 1100c may have different fields of view. In this case, the at least two camera modules (e.g., 1100a and 1100b) among the plurality of camera modules 1100a, 1100b, and 1100c may include different optical lens, but embodiments of the disclosure are not limited thereto.

In one embodiment, fields of view of the plurality of camera modules 1100a, 1100b, and 1100c may be different. In this case, the plurality of camera modules 1100a, 1100b, and 1100c may include different optical lens, not limited thereto.

In some embodiments, the plurality of camera modules 1100a, 1100b, and 1100c may be disposed to be physically separated from each other. That is, the plurality of camera modules 1100a, 1100b, and 1100c may not use a sensing area of one image sensor 1142, but the plurality of camera modules 1100a, 1100b, and 1100c may include independent image sensors 1142 therein, respectively.

In FIG. 9, the application processor 1200 may include an image processing device 1210, a memory controller 1220, and an internal memory 1230. The application processor 1200 may be implemented to be separated from the plurality of camera modules 1100a, 1100b, and 1100c. In one embodiment, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and a camera module controller 1216.

The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. In one embodiment, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but embodiments of the disclosure are not limited thereto.

In some embodiments, one sub image processor may be disposed to correspond to a plurality of camera modules. In one embodiment, the sub image processor 1212a and the sub image processor 1212c may be integrally implemented, not separated from each other as illustrated in FIG. 9; in this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information Generating Information or a mode signal.

In one embodiment, the image generator 1214 may generate the output image by merging at least a portion of the image data respectively generated from the camera modules 1100a, 1100b, and 1100c having different fields of view, depending on the image generating information Generating Information or the mode signal. In one embodiment, the image generator 1214 may generate the output image by selecting one of the image data respectively generated from the camera modules 1100a, 1100b, and 1100c having different fields of view, depending on the image generating information Generating Information or the mode signal.

In some embodiments, the image generating information Generating Information may include a zoom signal or a zoom factor. In one embodiment, the mode signal may be, for example, a signal based on a mode selected from a user.

In the case where the image generating information Generating Information is the zoom signal (or zoom factor) and the camera modules 1100a, 1100b, and 1100c have different visual fields of view, the image generator 1214 may perform different operations depending on a kind of the zoom signal. In one embodiment, in the case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation. In the case where the zoom signal is a second signal different from the first signal, without the image data merging operation, the image generator 1214 may select one of the image data respectively output from the camera modules 1100a, 1100b, and 1100c and may output the selected image data as the output image. However, the disclosure is not limited thereto, and a way to process image data may be modified without limitation if necessary.

In some embodiments, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) depending on the image generating information Generating Information including a zoom signal or the mode signal, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. In one embodiment, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some embodiments, the control signal provided from the camera module controller 1216 to each of the camera modules 1100a, 1100b, and 1100c may include a sync enable signal. In one embodiment, in the case where the camera module 1100b is used as a master camera and the camera modules 1100a and 1100c are used as a slave camera, the camera module controller 1216 may transmit the sync enable signal to the camera module 1100*b*. The camera module 1100*b* that is provided with sync enable signal may generate a sync signal based on the provided sync enable signal and may provide the generated sync signal to the camera modules 1100*a* and 1100*c* through a sync signal line SSL. The camera module 1100*b* and the camera modules 1100*a* and 1100*c* may be synchronized with the sync signal to transmit image data to the application processor 1200.

In some embodiments, the control signal provided from the camera module controller 1216 to each of the camera modules 1100*a*, 1100*b*, and 1100*c* may include mode information according to the mode signal. Based on the mode information, the plurality of camera modules 1100*a*, 1100*b*, and 1100*c* may operate in a first operating mode and a second operating mode with regard to a sensing speed.

In the first operating mode, the plurality of camera modules 1100*a*, 1100*b*, and 1100*c* may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. In one embodiment, the corresponding one among sub image processors 1212*a*, 1212*b*, and 1212*c* of the image processing device 1210 may perform decoding and may also perform image processing on the decoded image signal.

In the second operating mode, the plurality of camera modules 1100*a*, 1100*b*, and 1100*c* may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100*a*, 1100*b*, and 1100*c*, respectively. In one embodiment, under control of the application processor 1200, the PMIC 1300 may supply a first power to the camera module 1100*a* through a power signal line PSLa, may supply a second power to the camera module 1100*b* through a power signal line PSLb, and may supply a third power to the camera module 1100*c* through a power signal line PSLc.

In response to a power control signal PCON from the application processor 1200, the PMIC 1300 may generate a power corresponding to each of the plurality of camera modules 1100*a*, 1100*b*, and 1100*c* and may adjust a level of the power. The power control signal PCON may include a power adjustment signal for each operating mode of the plurality of camera modules 1100*a*, 1100*b*, and 1100*c*. In one embodiment, the operating mode may include a low-power mode. In this case, the power control signal PCON may include information about a camera module operating in the low-power mode and a set power level. Levels of the powers respectively provided to the plurality of camera modules 1100*a*, 1100*b*, and 1100*c* may be identical to each other or may be different from each other. In one embodiment, a level of a power may be dynamically changed.

According to an embodiment of the disclosure, a dual conversion gain operation of an image sensor including pixels sharing a floating diffusion region connected to a dual conversion transistor may be optimized.

In particular, according to an embodiment of the disclosure, as a pixel array is configured such that the pixels sharing the floating diffusion region connected to the dual conversion transistor are not simultaneously read out, charges may be prevented from being accumulated at the floating diffusion region by double in a low conversion gain mode, and a low conversion gain operation may be normally performed.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A pixel array comprising:
   a plurality of unit pixel groups; and
   a plurality of column lines, wherein two column lines are provided for each column,
   wherein each of the unit pixel groups comprises two rows, a first pixel group comprising a plurality of pixels and a second pixel group comprising a plurality of pixels,
   wherein the first pixel group and the second pixel group are arranged in a row direction,
   wherein a pixel signal is output by simultaneously reading out:
      a first set of two unit pixel groups that are connected to a first column line and that do not share a first floating diffusion region, and
      a second set of two unit pixel groups that are connected to a second column line different from the first column line and that do not share a second floating diffusion region, and
   wherein at least one of the first floating diffusion region and the second floating diffusion region is between a dual conversion transistor and a reset transistor, the dual conversion transistor and the reset transistor being included in each of the unit pixel groups.

2. The pixel array of claim 1, wherein a unit pixel group located at a first row and a second row from among the plurality of unit pixel groups shares the first floating diffusion region with a dummy unit pixel group adjacent to the unit pixel group.

3. The pixel array of claim 1, wherein a unit pixel group located at a (4N−1)-th row and a 4N-th row shares the first floating diffusion region with a unit pixel group located at a (4N+1)-th row and a (4N+2)-th row,
   wherein eight (8) continuous unit pixel groups located at a (16N−15)-th row to a (16N−8)-th row are connected to the first column line,
   wherein eight (8) continuous unit pixel groups located at a (16N−7)-th row to a 16N-th row are connected to the second column line, and
   wherein N is a natural number.

4. The pixel array of claim 3, wherein, in a first period, the first pixel groups located at a (4*(2N−1)−3)-th row, a (4*(2N−1)−1)-th row, a (4*(2N−1)+5)-th row, and a (4*(2N−1)+7)-th row are read out,
   wherein, in a second period, the second pixel groups located at a (4*(2N−1)−2)-th row, a (4*(2N−1))-th row, a (4*(2N−1)+6)-th row, and a (4*(2N−1)+8)-th row are read out, wherein, in a third period, the first pixel groups located at a (4*(2N−1)+1)-th row, a (4*(2N−1)+3)-th row, a (4*(2N−1)+9)-th row, and a (4*(2N−1)+11)-th row are read out, and wherein, in a fourth period, the second pixel groups located at a (4*(2N−1)+2)-th row, a (4*(2N−1)+4)-th row, a (4*(2N−1)+10)-th row, and a (4*(2N−1)+12)-th row are read out.

5. The pixel array of claim 4, wherein transfer transistors included in the first pixel groups or the second pixel groups read out in the first period, the second period, the third period, and the fourth period are turned on based on readout transfer pulses of a high level.

6. The pixel array of claim 1, wherein analog binning is performed on pixel signals read out from different columns.

7. The pixel array of claim 1, wherein the pixel array outputs a first pixel signal corresponding to a first conversion gain and a second pixel signal corresponding to a second conversion gain that is smaller than the first conversion gain.

8. The pixel array of claim 7, wherein the second pixel signal corresponds to charges stored in the first floating diffusion region having a second capacitance value.

9. The pixel array of claim 8, further comprising a capacitor connected to the first floating diffusion region to obtain the second capacitance value.

10. A pixel array comprising:
a plurality of unit pixel groups; and
a plurality of column lines, wherein a first column line and a second column line are provided for each column,
wherein each of the plurality of unit pixel groups comprises:
   a first pixel group located at a first row and comprising a plurality of first color pixels;
   a second pixel group located at a second row and comprising a plurality of second color pixels;
   a first floating diffusion region connected to transfer transistors of the first pixel group and the second pixel group;
   a dual conversion transistor;
   a reset transistor;
   a select transistor connected to one of the first column line and the second column line; and
   a second floating diffusion region connected to the dual conversion transistor and the reset transistor,
wherein first two unit pixel groups adjacent to each other from among the plurality of unit pixel groups share the second floating diffusion region, and
wherein a pixel signal is output by simultaneously reading out:
   second two unit pixel groups that are connected to the first column line and do not share the second floating diffusion region, and
   third two unit pixel groups that are connected to the second column line and do not share the second floating diffusion region.

11. The pixel array of claim 10, wherein a unit pixel group located at a first row and a second row from among the plurality of unit pixel groups shares the second floating diffusion region with a dummy unit pixel group adjacent to the unit pixel group.

12. The pixel array of claim 10, wherein a unit pixel group located at a (4N−1)-th row and a 4N-th row shares the second floating diffusion region with a unit pixel group located at a (4N+1)-th row and a (4N+2)-th row, wherein eight (8) continuous unit pixel groups located at a (16N−15)-th row to a (16N−8)-th row are connected to the first column line, wherein eight (8) continuous unit pixel groups located at a (16N−7)-th row to a 16N-th row are connected to the second column line, and wherein N is a natural number.

13. The pixel array of claim 10, wherein, in a first period, the first pixel groups located at a (4*(2N−1)−3)-th row, a (4*(2N−1)−1)-th row, a (4*(2N−1)+5)-th row, and a (4*(2N−1)+7)-th row are read out, wherein, in a second period, the second pixel groups located at a (4*(2N−1)−2)-th row, a (4*(2N−1))-th row, a (4*(2N−1)+6)-th row, and a (4*(2N−1)+8)-th row are read out, wherein, in a third period, the first pixel groups located at a (4*(2N−1)+1)-th row, a (4*(2N−1)+3)-th row, a (4*(2N−1)+9)-th row, and a (4*(2N−1)+11)-th row are read out, and wherein, in a fourth period, the second pixel groups located at a (4*(2N−1)+2)-th row, a (4*(2N−1)+4)-th row, a (4*(2N−1)+10)-th row, and a (4*(2N−1)+12)-th row are read out.

14. The pixel array of claim 13, wherein transfer transistors included in the first pixel groups or the second pixel groups read out in the first period to the fourth period are turned on based on readout transfer pulses of a high level.

15. The pixel array of claim 10, wherein analog binning is performed on pixel signals read out from different columns.

16. An image sensor comprising:
a pixel array comprising two column lines for each column and configured to output a pixel signal from a plurality of unit pixel groups;
a row driver configured to control each row of the pixel array; and
an analog-to-digital converting (ADC) circuit configured to convert the pixel signal into a digital signal,
wherein each of the unit pixel groups comprises two rows, a first pixel group comprising a plurality of pixels, a second pixel group comprising a plurality of pixels,
wherein the first pixel group and the second pixel group are arranged in a row direction,
wherein the pixel signal is output by simultaneously reading out:
   a first set of two unit pixel groups that are connected to a first column line and that do not share a first floating diffusion region, and
   a second set of two unit pixel groups that are connected to a second column line different from the first column line and that do not share a second floating diffusion region, and
wherein at least one of the first floating diffusion region and the second floating diffusion region is between a dual conversion transistor and a reset transistor, the dual conversion transistor and the reset transistor being included in each of the unit pixel groups.

17. The image sensor of claim 16, wherein a unit pixel group located at a first row and a second row from among the plurality of unit pixel groups shares the first floating diffusion region with a dummy unit pixel group adjacent to the unit pixel group.

18. The image sensor of claim 16, wherein a unit pixel group located at a (4N−1)-th row and a 4N-th row shares the first floating diffusion region with a unit pixel group located at a (4N+1)-th row and a (4N+2)-th row, wherein eight (8) continuous unit pixel groups located at a (16N−15)-th row to a (16N−8)-th row are connected to the first column line, wherein eight (8) continuous unit pixel groups located at a (16N−7)-th row to a 16N-th row are connected to the second column line, and wherein N is a natural number.

19. The image sensor of claim 16, wherein the pixel array is configured to:

read out the first pixel groups located at a (4*(2N−1)−3)-th row, a (4*(2N−1)−1)-th row, a (4*(2N−1)+5)-th row, and a (4*(2N−1)+7)-th row, in a first period;

read out the second pixel groups located at a (4*(2N−1)−2)-th row, a (4*(2N−1))-th row, a (4*(2N−1)+6)-th row, and a (4*(2N−1)+8)-th row, in a second period;

read out the first pixel groups located at a (4*(2N−1)+1)-th row, a (4*(2N−1)+3)-th row, a (4*(2N−1)+9)-th row, and a (4*(2N−1)+11)-th row, in a third period; and read out the second pixel groups located at a (4*(2N−1)+2)-th row, a (4*(2N−1)+4)-th row, a (4*(2N−1)+10)-th row, and a (4*(2N−1)+12)-th row, in a fourth period.

20. The image sensor of claim 19, wherein the row driver is configured to transfer readout transfer pulses of a high level to the first pixel groups or the second pixel groups read out in the first period to the fourth period.

* * * * *